United States Patent [19]

Bequet et al.

[11] Patent Number: 4,765,226
[45] Date of Patent: Aug. 23, 1988

[54] BRAKE BOOSTER WITH A HINGED POSITIONING MEMBER

[75] Inventors: Franck Bequet, Créteil; Jean-Jacques Carre, Le Raincy, both of France

[73] Assignee: Bendix France, Drancy, France

[21] Appl. No.: 39,555

[22] Filed: Apr. 16, 1987

[30] Foreign Application Priority Data

Apr. 23, 1986 [FR] France .................. 86 05857

[51] Int. Cl.4 .......................................... F15B 9/10
[52] U.S. Cl. .............. 91/369 A; 91/369.2; 91/376 R
[58] Field of Search ............. 91/369 A, 369 B, 369 C, 91/376 R

[56] References Cited

U.S. PATENT DOCUMENTS

| | | | |
|---|---|---|---|
| 3,002,499 | 10/1961 | Schultz | 91/369 B X |
| 3,688,647 | 9/1972 | Kytta | 91/369 C X |
| 4,491,058 | 1/1985 | Morin | 91/369 C X |
| 4,577,548 | 3/1986 | Gautier | 91/376 R X |
| 4,594,937 | 6/1986 | Meynier et al. | 91/369 R |
| 4,619,185 | 10/1986 | Mori et al. | 91/376 R X |

FOREIGN PATENT DOCUMENTS

| | | |
|---|---|---|
| 0153238 | 8/1985 | European Pat. Off. . |
| 3039725 | 7/1981 | Fed. Rep. of Germany . |
| 124455 | 7/1984 | Japan .................. 91/369 A |
| 154949 | 8/1985 | Japan . |
| 2064690 | 6/1981 | United Kingdom . |

Primary Examiner—Robert E. Garrett
Assistant Examiner—Mark A. Williamson
Attorney, Agent, or Firm—Larry J. Palguta; Ken C. Decker

[57] ABSTRACT

The booster comprises, in a radial opening (21) of the valve body (6), a first positioning member (22) fastened in the valve body and a second positioning member (23) interposed between the first positioning member and an interacting shoulder (19) of the valve plunger (14), the second positioning member (23) internally associated in a hinged connection with the first positioning member and having an outer end zone (30) interacting, in a rest position of the booster, with a stationary surface (31), with which the piston structure (2–5) also interacts by coming up against it, to assign to the valve plunger (14) a specific rest position relative to the valve body (6).

9 Claims, 2 Drawing Sheets

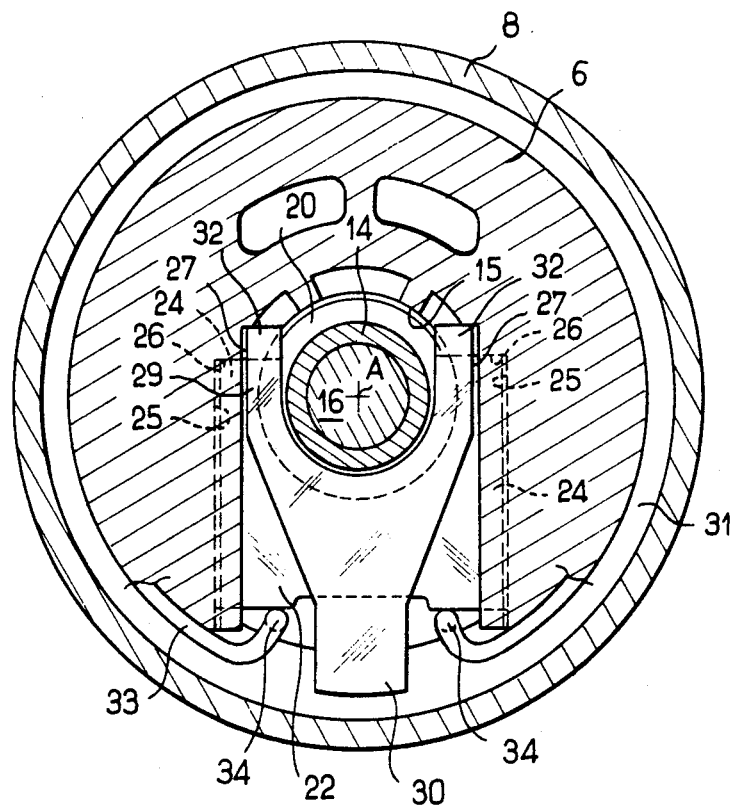
FIG_2
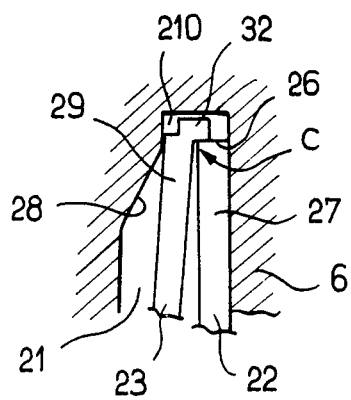
FIG_3

BRAKE BOOSTER WITH A HINGED POSITIONING MEMBER

The present invention relates to brake boosters, especially for motor vehicles, and more particularly to pneumatic boosters of the type comprising a housing, a piston structure dividing the housing internally into two chambers, a distribution valve means arranged in a valve body integral with the piston structure and actuable by means of an input member to generate a pressure differential selectively between the chambers, the valve means having a plunger mounted axially slideably in a coaxial central bore of the valve body and connected to the input member, the plunger having at least a first peripheral shoulder and defining, at one of its ends, a first flap seat, a second flap seat formed in the valve body concentrically relative to the first flap seat and a flap means mounted in the valve body and stressed elastically towards the first and second flap seats, a restoring spring bearing in the valve body and stressing the input member axially in the direction away from the flap seats, and means for positioning the plunger, arranged in a radial opening of the valve body opening into the central bore, which interact with the plunger to assign to it at least two separate specific axial positions relative to the valve body.

Boosters of this type are described in the documents FR-A-No. 2,469,589 and EP-A-No. 0,153,238. In the first of these documents, the means for positioning the plunger consist of a single key mounted in the radial opening of the valve body with a possibility of axial movement in and arrangement which does not make it possible to guarantee reliable and accurate movement of the positioning key in relation to the valve body, nor to prevent risks of interference with the relative movement of the plunger or skewing of the positioning key relative to the plunger and/or to the valve body, entailing problems of mechanical strength in respect of the key, particularly due to keeping the key "floating" in the valve body taking into account the many opposing stresses to which the key is subjected during the different phases of operation of the booster. In the second of these documents, the positioning means also consist of a single key mounted pivotably on the valve body, in a more accurate arrangement during operation than that in the preceding document but entailing, like the latter, problems of mechanical strength in respect of the key taking into account the opposing forces to which it is subjected, which may lead to losses in the booster's sensitivity, and which may moreover impose a particular relative radial dimensioning of the valve body and of the rear central part of the housing.

An object of the present invention is to provide a brake booster of the above-mentioned type, of simple and robust construction, accurate and reliable in operation and, in particular, not influencing the capacities of the plunger to slide coaxially in the central bore of the valve body.

To achieve this, according to one feature of the invention, the means of positioning the plunger consist of the combination of a first positioning member mounted fixedly in the radial opening and having an inner end zone extending in the central bore, and of a second positioning member mounted rockingly in the radial opening and comprising an inner end zone extending in the central bore between the first shoulder of the plunger and the inner end zone of the first positioning member and interacting with the latter in hinged contact, a central portion and an outer end capable of interacting, in the vicinity of the rest position of the booster, with a stationary element connected to the housing to cause the second positioning member to rock from a first position, in which the first and second positioning members are axially adjacent, and a second position, in the rest position of the booster, in which the second positioning member, bearing against the shoulder of the plunger by means of its inner end zone, is angularly at a distance from the first positioning member.

According to a more particular feature of the invention, the first positioning member has lateral fins engaged in opposing grooves formed laterally in the radial opening, the end zone of the first positioning member typically exhibiting a U-shaped profile with two lateral arms having ends situated, in the assembly configuration in the radial opening, on the axis side of the central bore of the valve body away from the outer end of the second positioning member the inner end zone of which also exhibits a U-shaped profile with two lateral arms having end portions extending axially above the ends of the lateral arms of the inner end zone of the first positioning member.

The present invention will now be described by way of examples with reference to the accompanying drawings in which:

FIG. 2 is a diagrammatic cross-sectional view along the sectional line II—II of FIG. 1; and FIG. 3 is a diagrammatic view on a larger scale showing the relative arrangement of the inner end zones of the first and second positioning members of the booster of FIG. 1.

Figure 1:
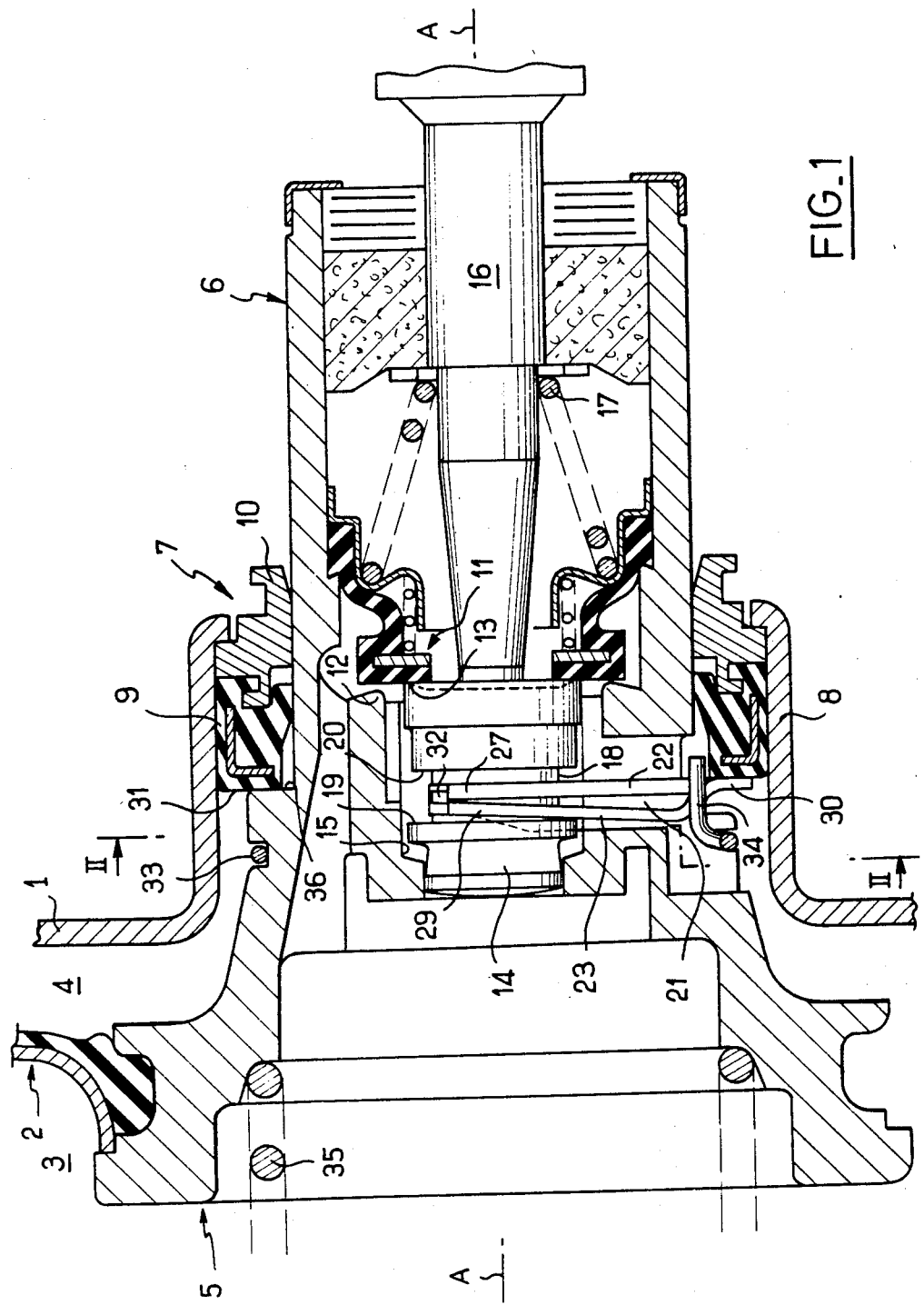
FIG. 1 is a partial view in longitudinal section of one embodiment of a brake booster according to the invention.

As illustrated in the drawings, a pneumatic brake booster according to the invention comprises a housing, of which the central portion of the rear wall 1 can be seen in FIG. 1, divided internally by a movable piston wall 2 into a front chamber 3, or vacuum chamber, and a rear chamber 4, or working chamber. The movable wall 2 is fastened centrally to a hub 5 which is typically made of plastic and which is extended rearwards and outwards by means of a tubular valve body 6 guided sealingly and slideably by a guide and sealing assembly 7 mounted in a rear tubular extension 8 of the rear housing wall 1 and consisting of an associated assembly of a sealing ring made of reinforced elastomeric material 9 and of an annular guide ring 10, made, for example, of rigid plastic.

Mounted in the valve body 6 is an axially elastically stressed flap means designated as a whole by the reference 11, which is intended to interact with a fixed flap seat 12 formed centrally in the valve body 6 and with a movable flap seat 13 formed by the rear end of a valve plunger 14 sliding in a central bore 15 of the valve body coaxially relative to the axis A of symmetry of revolution of the hub 5, the plunger 14 being integral with the end of an input and actuating rod 16, the other end of which is intended to be connected to a vehicle brake pedal (not shown). In the final assembly configuration, the hub 5 is associated with an output rod (not shown) coupled to a brake master cylinder piston. The rod 16 (and, consequently, the plunger 14) is stressed axially rearwards by means of a restoring spring 17 bearing on a shoulder of the rod 16 and on a shoulder inside the valve body 6. The plunger 14 has a peripheral annular groove 18 defining a first radial shoulder 19 directed rearwards and a second radial shoulder 20 facing it. The valve body 6 has a transverse radial opening 21 opening into the bore 15 and establishing, in particular, a fluid communication between the fixed flap seat 12 and the rear chamber 4 of the booster.

According to the invention, a fixed first positioning member 22 and a rocking second positioning member 23 are arranged in the radial opening 21. The first positioning member 22, produced from a metal plate, has a general rectangular plane shape and is mounted by means of parallel lateral fins 24 in opposing parallel grooves 25 formed laterally on either side of the radial opening 21 and being extended inwards, beyond the axis A of the booster, ending in shoulders 26 restricting the insertion of the first positioning member 22 into the valve body 6. As can be seen on FIG. 2, the first positioning member 22 has an inner end zone extending partially into the central bore 15 and, without radial contact, into the annular groove 18 of the plunger 14 and also exhibiting a U-shaped profile with two lateral arms 27 coming up against the shoulders 26 by means of their ends.

The radial opening 21 exhibits, in front of the first positioning member 22, an axially open-ended profile with a main portion opening to the outside with a relatively large axial extension becoming narrower towards the inside, as shown at 28 on FIG. 3, thereby forming, on either side of the bore 15, an inner end portion 210 with a tapered axial extension and extending radially beyond the shoulders 26 of the groove 25. The second positioning member 23, typically produced from a metal plate, exhibits a central body portion of generally trapezoidal shape which is extended, towards the inside, by means of an inner end zone which, like the first positioning member 22, exhibits a U-shaped profile with two lateral arms 29 partially received in the annular groove 18 of the plunger 14 and, towards the outside, by means of an outer end zone 30 projecting radially outside the valve body 6 and exhibiting an end, offset axially rearwards relative to the main body part, to interact with a fixed reference face of a stationary element connected to the housing by coming up against it, which end advantageously consists, in the example shown, of the front annular face 31 of the seal 9 of the guide and sealing assembly 7. The ends of the arms 29 of the inner end zone of the second positioning member 23 extend in the inner end portion 210 of the radial opening 21 beyond the end edge of the arms 27 of the inner end zone of the first positioning member 22, these ends of the arms 29 having parts 32 which are turned down or cut and deformed and which extend axially rearwards above the end edge of the arms 27 in an arrangement which ensures that the ends of the arms 29 of the second positioning member 23 are retained in the inner end portion 210 of the opening 21 and in contact forming a hinge C with the end of the arms 27 of the first positioning member 22. The first positioning member 22 may be inserted into the opposing grooves 25 by applying a gentle force or by sliding them right into the latter, in which case a retaining wire spring of a general-shape at 33 is arranged in a peripheral groove of the valve body 6, the ends facing the spring 33 being turned down inside the zone opening to the outside of the opening 21 and having folded-up portions 34 extending axially on either side of the end zone 30 of the second positioning member 23 bearing against the outer edges of the first positioning member 22 to retain the latter and, consequently, via end portions 32, the second positioning member 23 in the opening 21.

The mode of operation of the booster according to the invention is as follows:

When the booster is actuated, exerting a forward axial force on the rod 16, the plunger 14 moves forwards in the bore and, in the first instance, after a brief initial actuating stroke, causes the flap element 11 to come into contact with the first flap seat 12 to isolate the two chambers 3 and 4 from one another and then, in the second instance, to open a passage of fluid between the flap element 11 and the second flap seat 13 to admit the atmospheric pressure into the working chamber 4 and thereby move the piston structure 2 forwards as it meets a restoring spring 35 stressing the latter in the direction towards the rear housing wall 1. During such a braking phase, the plunger 14 does not interfere with any of the positioning members 22 and 23 and the second positioning member 23 assumes or maintains a neutral position. In the event of failure of the vacuum source, the plunger 14 comes up against the first positioning member 22 by means of its second shoulder 20, thus integrally connecting the hub 5 and the rod 16 by movement forwards. If, in normal assisted operation, during such a braking phase, the force exerted on the input rod 16 is relaxed, the latter moves rearwards relative to the valve body 6 under the effect of the restoring spring 17 and the plunger 14, returning into contact with the flap element 11 by means of its seat 13, moves the latter elastically rearwards to free it from the flap seat 12 and restore communication between the chambers 3 and 4. To allow a rapid recovery of balance in pressure (in this particular case, partial vacuum) between these two chambers 3 and 4, the plunger 14 is allowed to move back axially over a relatively long distance in relation to the valve body 6, the passage, known as the excess opening passage, between the flap seat 12 and the flap element 11 being thus determined accurately because the first shoulder 19 of the plunger 14, under the effect of the restoring spring 17, comes up against the inner end zone of the second positioning member 23 which then comes up flat against the first positioning member 22, the excess opening play being thus determined, as a result of the construction, by the relative position of the grooves 25 in the valve body 6 in relation to the fixed plane of the seat 12 and by the cumulative axial thickness of the positioning members 22 and 23. When the force on the input rod is finally released, the hub 5 and the piston structure 2 are brought back towards the rear housing wall 1 under the effect of the restoring spring 35. According to one aspect of the invention, the rest position of the piston structure 2 and of the hub 5 is advantageously determined by a radial shoulder 36 formed at the periphery of the valve body 6 coming up against the front face 3 of the seal 9, and this thus ensures a reduction in the lines of studs for the precise determination of the respective rest positions of the hub 5 and of the plunger 14, as described below. When the booster arrives in the vicinity of its rest position, the outer end zone 30 of the second positioning member 23, which hitherto remained flat against the first positioning member 22 by means of the first shoulder 19 of the plunger 14 under the effect of the restoring spring 17, comes to bear against the front face 31 of the seal 9, thereby causing the second positioning member to rotate to the right (see FIG. 1) about the hinge of transverse axis C so that, as the second positioning member 23 moves angularly away from the first positioning member 22, it moves the plunger 14 (and the rod 16) forwards by means of its inner end zone, so as to reduce the play between the flap element 11 and the flap seat 12. The play at rest, corresponding to the idle actuating stroke of the booster, between the flap element 11 and the fixed seat 12 is therefore defined accurately and in a perfectly reproducible manner on a mass scale by the angular position finally assumed by the second positioning member 23 bearing, by means of its outer end zone 30, against the surface 31 against which the shoulder 36 of the hub 5 in turn finally comes to bear.

Although the present invention has been described in connection with a particular embodiment, it is not restricted by it but is, on the contrary, capable of modifications and of variations which will become apparent to a person versed in the art.

What is claimed is:

1. A brake booster comprising a housing, a piston structure dividing the housing internally into two chambers, distribution valve means arranged in a valve body integral with the piston structure and actuatable by means of an input member to generate selectively a pressure differential between the chambers, the valve means comprising a plunger mounted axially and slideably in a coaxial central bore of the valve body and connected to the input member, the plunger having at least one peripheral shoulder and defining, at one plunger end, a first flap seat, a second flap seat formed in the valve body concentrically relative to the first flap seat and flap means mounted in the valve body and stressed elastically toward the first and second flap seats, a restoring spring bearing in the valve body and axially stressing the input member in a direction away from the flap seats, and means for positioning the plunger arranged in a radial opening of the valve body opening into the central bore and interacting with the plunger to assign to the plunger at least two separate specific axial positions relative to the valve body, characterized in that the positioning means comprises a combination of a first positioning member mounted fixably in the radial opening and having an inner end zone extending in the central bore and of a second positioning member mounted rockingly in the radial opening and comprising an inner end zone extending in the central bore between the first shoulder of the plunger and the inner end zone of the first positioning member and interacting with the first positioning member in hinged contact, a central portion and an outer end capable of interacting, in the vicinity of a rest position of the booster, with a stationary element connected to the housing to cause the second positioning member to rock from a first position in which the inner end zones are axially adjacent and a second position, in the rest position of the booster, in which the second positioning member, bearing against the first shoulder by means of the associated inner end zone, is set angularly at a distance from the first positioning member, the distance increasing in a direction away from the inner end zones and toward said outer end, the inner end zone of the first positioning member having a U-shaped profile with two lateral arms having ends situated, in an assembly configuration, on the axis side of the central bore away from the outer end of the second positioning member, the inner end zone of the second positioning member having a U-shaped profile with two lateral arms having end portions extending axially above the ends of the lateral arms of the inner end zone of the first positioning member in order to provide said hinged contact therebetween, the positioning members located adjacent one another within the valve body.

2. The booster according to claim 1, characterized in that the first positioning member has lateral fins engaged in opposing grooves formed laterally in the radial opening.

3. The booster according to claim 1, characterized in that the first and second positioning members are each formed from a metal sheet and exhibit a substantially planar shape.

4. The booster according to claim 3, characterized in that the first positioning member is force-fitted in the lateral grooves of the radial opening.

5. The booster according to claim 3, characterized in that the booster comprises a retaining member of the first positioning member comprising a wire spring surrounding the valve body.

6. The booster according to claim 5, characterized in that the wire spring exhibits a C-shape with two end portions extending axially in the radial opening and interacting with an end of the first positioning member away from the associated inner end zone.

7. The booster according to claim 1, characterized in that the stationary element is formed by a seal part of a guide and sealing annular assembly of the valve body carried by a rear housing wall.

8. The booster according to claim 7, characterized in that the valve body comprises a bearing surface intended to interact with the stationary element by coming up against the stationary element in the rest position of the booster.

9. The booster according to claim 1, characterized in that the first shoulder of the plunger is formed by a peripheral annular groove defining a second annular shoulder facing axially the first shoulder and capable of interacting with the inner end zone of the first positioning member in a third specific axial position of the plunger relative to the valve body.

* * * * *